May 29, 1951 — L. M. HARVEY — 2,554,570
MEASURING LIQUID DISPENSER HAVING RESILIENT WALLS
Filed Sept. 27, 1948 — 2 Sheets-Sheet 1
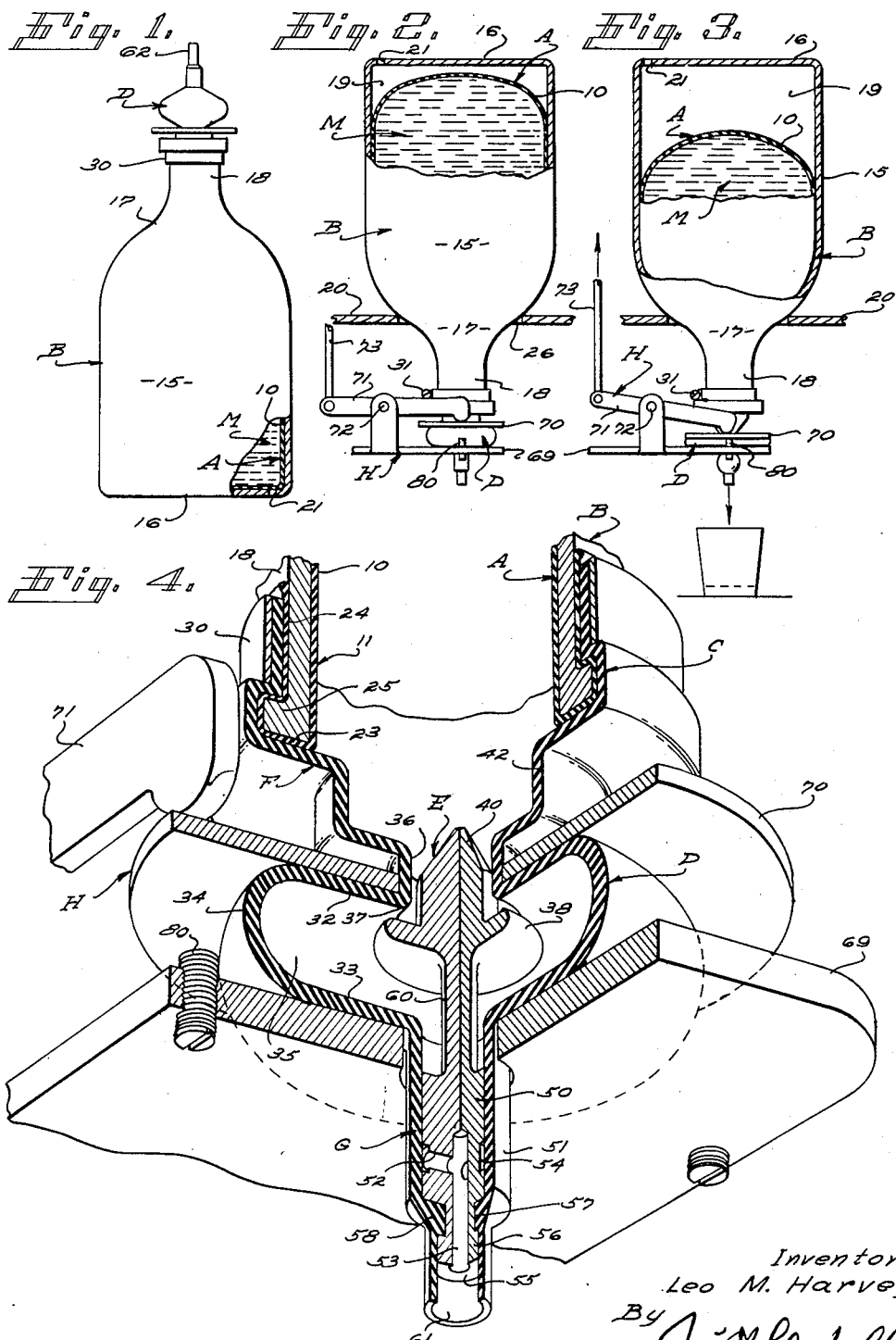
Inventor
Leo M. Harvey
By
Attorney May 29, 1951 L. M. HARVEY 2,554,570
MEASURING LIQUID DISPENSER HAVING RESILIENT WALLS
Filed Sept. 27, 1948 2 Sheets-Sheet 2
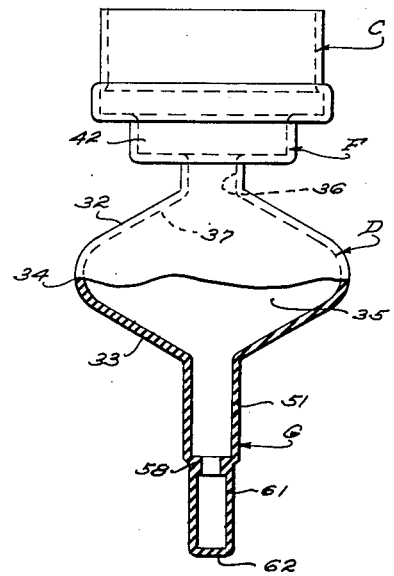
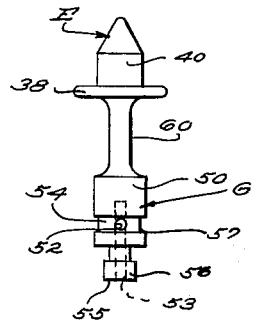
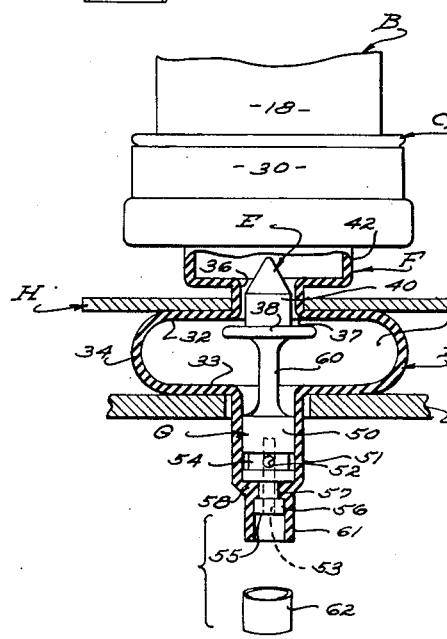
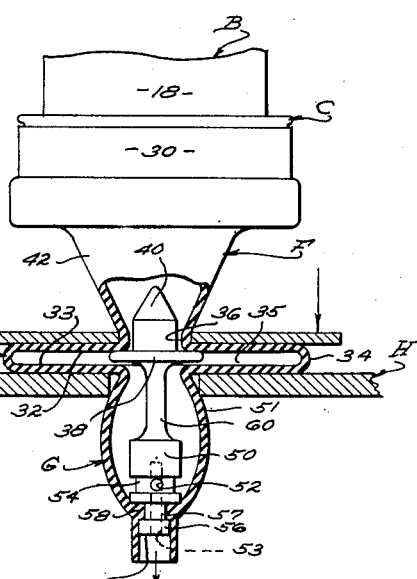
Inventor
Leo M. Harvey
By
Attorney Patented May 29, 1951

2,554,570

UNITED STATES PATENT OFFICE 2,554,570

MEASURING LIQUID DISPENSER HAVING RESILIENT WALLS

Leo M. Harvey, Los Angeles, Calif.

Application September 27, 1948, Serial No. 51,334

15 Claims. (Cl. 222—207)

This invention has to do with a measuring liquid dispenser, that is, with a device effective for dispensing liquids and serving to effectively and accurately dispense such liquids in measured quantities. It is a general object of this invention to provide a device or structure of the general character referred to which is simple, practical and effective.

There are various materials required to be dispensed in small and accurately measured quantities, this being particularly true of liquids of various kinds. Numerous devices or structures have been proposed and used for dispensing liquids in measured quantities such devices ordinarily being in the nature of valve mechanisms with slide or poppet valves requiring springs, complicated ported parts, and various other features of construction and arrangement rendering them generally expensive of manufacture, difficult to clean or to maintain in a sanitary condition, and in many cases inaccurate and undependable in operation.

It is a primary object of this invention to provide a dispensing device or mechanism particularly effective for handling liquids and which serves to accurately dispense or deliver predetermined quantities of liquid and which is of such simple, inexpensive construction that it may be discarded after limited use, as for instance, when the contents of a container, to which it is applied or with which it is combined has been exhausted.

Another object of this invention is to provide a dispensing mechanism of the general character referred to involving but two unitary elements which combine to establish a complete mechanism with means for coupling to a container, or the like, a measuring cell, and inlet and outlet valves. With the construction provided by the present invention the elements which make up the mechanism are exceedingly simple in form and manufacture, are easily assembled and are accurate and dependable in operation.

A further object of the invention is to provide a mechanism of the character referred to in which the two elements which combine to make up the mechanism are both such that they can be advantageously formed of inexpensive materials so that they can, if desired, be disposed of after but limited use.

It is another object of this invention to provide a dispensing mechanism of the general character referred to combined with a container so that a body of liquid to be dispensed is maintained out of contact with the air at all times during operation of the apparatus and until such time as the full supply of material has been dispensed. By the present invention an envelope or elastic container carries the supply of liquid and the liquid has no means whatever of contacting the outside air except through the dispensing mechanism through which it discharges as it is required for use. By means of the present invention I am able to effectively, practically, and commercially handle perishable liquids such as certain food products that are either spoiled or contaminated by contact with air, or which congeal or otherwise become difficult to handle if exposed to air.

The various objects and features of my invention will be fully understood from the following detailed description of a typical preferred form and application of the invention, throughout which description reference is made to the accompanying drawings, in which:

Fig. 1 is a side elevation of a structure embodying the present invention showing it prior to being ready for operation and in a position such as may be maintained in the course of being transported or handled preliminary to being put into use. Fig. 2 is a view showing the apparatus in condition for use and ready to be operated, certain parts being broken away to show in section. Fig. 3 is similar to Fig. 2 showing the structure operated or in the course of operation to discharge a measured quantity of fluid. Fig. 4 is an enlarged perspective view of the dispensing mechanism position by the present invention, showing the parts in the position illustrated in Fig. 2, and with a section of the mechanism removed so that parts appear in section to illustrate their construction and relationship. Fig. 5 is a side elevation of one of the two elements forming the dispensing mechanism, a portion of the element being broken away to show in section. Fig. 6 is a side elevation of the other element of the dispensing mechanism. Fig. 7 is a side elevation of the lower end portion of the container showing the dispensing mechanism attached thereto and in section and in an unactuated position, and Fig. 8 is a view similar to Fig. 7 showing the dispensing mechanism actuated.

The structure shown as including the present invention involves, generally a reservoir or container A, a carrier B for the container A, and a dispensing mechanism which includes, generally, a base C applicable to the container A, a transfer or measuring cell D, an inlet valve E, a supply connection F between the base and inlet valve, an outlet valve G, and operating means H.

The general or various major elements entering into the structure provided by the present invention may, in practice, vary widely in form and construction, depending on factors such as the liquid or material to be handled, the character of the service to be performed, etc. In the drawings I have elected to illustrate a simple or plain form of the invention such as may be used to advantage for dispensing liquid, say for example, a food product such as a syrup or juice, etc., and I have shown a form of the invention intended to be disposable, that is, such that the entire structure may be discarded when the contents of the container have been consumed.

The container A carries a supply of material M to be dispensed and in the form illustrated it comprises a body 10 carrying the supply of fluid M and a neck 11 through which the material flows in the course of being discharged. The neck 11 serves as a passage or element through which the liquid is introduced into the body 10 as the apparatus is filled and it is filled and it is the element through which the material flows or passes as the mechanism is operated, as will be hereinafter described.

In accordance with the preferred form of the invention the body 10 is variable as to size or capacity being a contractible element, and it serves to carry the desired supply of material M without contact with air. As shown in the drawings the body 10 may be a bag-like member formed of elastic material such as rubber, or a rubber-like composition, and it may be so formed as to be of very limited capacity when fully contracted to a point where it is immediately adjacent the neck 11. It will be apparent that by forming the body 10 of rubber or rubber-like material of suitable character the body may be expanded or blown up by the material M to be of substantial size and it will be apparent that it serves as a membrane confining the material M and separating it from the air.

In the preferred form of the invention the neck 11 of the container is a tubular part of limited size or diameter and it is preferably an integral continuation of the body 10, in which case it is advantageously formed of the same material as is employed in the formation of the body 10.

The carrier B for the container A preferably encases the container so that the body 10 thereof is entirely within the carrier and is fully protected thereby, while only the neck portion is exposed or accessible. In practice the carrier may vary widely in form and construction, it being preferred in most cases that it be a rigid structure or element made sufficiently large to accommodate the body 10 of the container when it is full. In the case illustrated the carrier B has a main portion formed of cylindrical side wall 15 and ends 16 and 17. A tubular extension 18 on one of the ends serves to receive and hold the neck 11 of the container while the body of the container is confined in the chamber 19 formed by the wall 15 and the ends 16 and 17. In the case illustrated the carrier B is in the form of a bottle or is bottle-shaped, in which case the end 16 is flat, forming a seat bottom on which the structure may rest in the course of being filled or handled, whereas the end 17 is in the nature of the top portion of a bottle with the extension 18 are suitable for application to a supporting frame 20 provided to carry the structure in operating position, as shown in Figs. 2 and 3 of the drawings. When applied to the frame the carrier is reversed or upside down from the position shown in Fig. 1, and has the flat bottom 16 at its upper end or top.

In accordance with the invention a vent opening 21 is provided in the carrier, preferably in the end 16, so that air is admitted to the interior of the carrier to result in full equalization of pressure around the body 10 of the container.

In the preferred construction the neck 11 of the container is so applied to the extension 18 of the carrier as to have an outwardly projecting end portion 23 engaging the end of the extension 18, while a sleeve portion 24 projects from the flange 23 and returns over or overlies the extension 18 as clearly illustrated in Fig. 4 of the drawings. It will be apparent from the drawings that the extension 18 may, in such case, be provided with a projection or bead 25 around which the parts of the neck engage providing a secure engagement between the neck of the container 10 and the extension 18 of the carrier B.

The support or frame 20 serving to hold the structure in operating position as shown in Figs. 2 and 3 of the drawings may be a simple fixed plate-like element with an opening 26 receiving the carrier B so that the extension 18 of the carrier depends from the support.

The dispensing mechanism provided by the present invention is applied to the extension 18 of the container carrier B to be joined with the container A and to depend from the assembly formed by the container and carrier. In the preferred form of the invention the dispensing mechanism has direct and sealed engagement with the neck of the container A so that no intermediate parts or connections are involved.

The base C of the dispensing mechanism is preferably a simple annular or tubular part applied around the extension 18 of the carrier B to bear upon the sleeve 24 of the container A. It is preferred to form the base C of rubber, or the like, and to so proportion it as to require that it be expanded considerably in order to fit over the extension 18 with the result that it snugly grips the exterior of the sleeve portion 24 of the neck 11.

In practice it is preferred that a clamp or holding device be applied to the elements just referred to so that the case C of the dispensing mechanism is securely, positively, and dependably secured around the sleeve of the neck. In the form of the invention illustrated a clamp band 30 is shown engaged around the portion of the base which surrounds the sleeve, the band being a split ring made tight by a screw 31.

The transfer cell provided by the present invention is a collapsible cell normally open or expanded and such as to receive and hold a predetermined quantity of material or liquid. In the form of the invention illustrated the cell D is of simple formation and involves merely a top wall 32, a bottom wall 33 and a side wall 34 joining the top and bottom walls. The top and bottom walls 32 and 33 are preferably flat parallel elements round in plan configuration, while the side wall is an outwardly curved element joined to and extending between the peripheral portions of the top and bottom walls. In order that the cell D be collapsible the side wall 34 is flexible or so constructed as to have suitable flexibility. In practice it is preferred that the side wall 34 be formed of rubber or rubber-like material and, in fact, it is preferred that the several walls of the cell be formed of the same material in which case they are one continuous body of rubber having the desired shape or contour as shown in the drawings.

When the cell D is in its normal open or expanded position as shown in Fig. 4 the top and bottom walls 32 and 33 are a substantial distance apart and the opening or cavity 35 established by the cell has the desired capacity. When the cell is operated or collapsed, as shown in Figs. 3 and 8 of the drawings the top and bottom walls of the cell closely approach each other or may even be moved into engagement with each other under which condition the cell is wholly or practically empty or free of liquid.

The inlet valve E of the dispensing mechanism admits liquid from the container A into the cell D through the top of the cell and in the form of the invention illustrated such liquid is conducted from the neck of the container to the valve by the supply connection F. The inlet valve, in the form illustrated, involves, generally, a tubular duct 36 joined to the top 32 of the cell and projecting upwardly therefrom, a seat 37 located where the duct 36 joins the top wall 32 of the cell, and a valve head 38 arranged to cooperate with the seat.

The duct 36 of the inlet valve is a simple, vertically disposed tubular part that may be considerably smaller in diameter than the neck 11 of the container A and it is preferably connected to the center of the top wall 32 of the cell D so that it opens into the chamber 35 of the cell. The seat 37 of the valve E occurs at or is formed by the corner where the duct 36 joins the top wall 32 of the cell and where the duct and cell parts are formed or rubber or rubber-like material, the seat portion 37 is conformable and need be of no special form or configuration.

The valve head is, preferably a simple, flat, disc-like part somewhat large in diameter than the duct 36 and it is located in the chamber 35 of the cell D in line with the duct 36 and immediately beneath the seat 37. When the valve E is open the seat 38 is down as shown in Fig. 4, in which case it is away from the seat 37 and liquid is free to flow through the duct 36 and into the chamber 35 of the cell. During initial downward movement of the top wall 32 of the cell as the mechanism is operated the seat 37 contacts the valve head, closing communication between the duct 36 and the chamber 35. In the preferred construction the valve head is provided with a guide 40 which projects upwardly from the valve and has ribs which may engage the interior of the duct 37. The ribs are preferably such as to effectively guide the valve head without interfering with flow through the duct 36 and into the chamber 35.

The supply connection F extends between the base C and the duct 36 of valve E. The connection F is preferably a simple tubular structure or element, the upper end of which is joined directly to the upper end of duct 36. In practice it is preferred that the connection F be formed of rubber or rubber-like material, in which case it is integrally joined with the duct 36 which is likewise of rubber or rubber-like material. It will be apparent that the base C may be advantageously formed of rubber or rubber-like material, in which case it may be integrally joined with the connection F.

The connection F being formed of rubber or rubber-like material is subject to operation or extension as the mechanism operates from the position shown in Figs. 2, 4 and 7 to that shown in Figs. 3 and 8. It will be apparent that the connection F may be advantageously formed and constructed so that it allows for the desired operation or movement of the portions of the mechanism requiring movement for proper operation of the mechanism. In the particular case illustrated the connection F has a tubular intermediate portion 42 designed to readily allow for the desired elongation of the connection.

The outlet valve G, as provided by the present invention, is characterized by a core 50 and a jacket 51 surrounding the core. The core 50 is preferably a rigid element formed of glass, a solid or rigid plastic or composition, and it is an elongate part preferably round in cross section. In the form illustrated the core has a fluid handling passage through it formed by one or more radially disposed inlet ports 52 and a single central downwardly opening outlet port 53. The inlet ports are shown communicating with an annular recess 54 in the exterior of the core and the inner ends of the ports 52 join the upper end portion of the port 53 while the port 53 extends down through the core and opens at the lower end 55 thereof.

The jacket 51 of the valve G is a tubular elastic element preferably formed of rubber or rubber-like material and its upper end is joined to and is in communication with the cell D. As shown in the drawings the upper end of the jacket 51 may be integrally joined with the lower wall 33 of the cell D so that the jacket is in communication with the chamber 35 of cell D. The jacket 51 depends centrally from the cell D and it is shaped and proportioned to normally snugly embrace or fit around the core 50 so that it covers the annular recess 54 and consequently closes the inlet ports 52. It is preferable to provide a tight or sealed connection between the lower end portion of the jacket 51 and the lower end portion of the core 50.

In the case illustrated the core has a reduced lower end portion 53 with an undercut groove 57 while the lower end portion 58 of the jacket 51 is of reduced diameter and snugly embraces the portion 56 of the core and is permanently seated in the undercut 57. The portion of the jacket 51 that extends from the reduced lower end portion 58 to the wall 55 of cell D is thin-walled and may be of uniform wall thickness so that upon application of fluid pressure to the outlet valve as by the application of pressure to the fluid in chamber 35, the jacket 51 expands moving away from or freeing the core so that the recess 54 and ports 52 are opened, as shown in Fig. 8. As the jacket 51 expands away from the core 50 the fluid from the cell D is free to pass through the jacket and out through the ports of the core to discharge from the lower end of the structure. It will be apparent that if pressure is applied collapsing the cell D from the position shown in Fig. 7 to that shown in Fig. 8, the fluid will be forced out through the outlet valve and as the final amount of fluid is discharged the jacket 51, in assuming its normal position collapses onto the core 50 closing the ports in the core.

In the preferred form of the invention a stem 60 connects the valve head 38 of the inlet valve E with the core 50 of the outlet valve G so that these parts form a rigid unit. When the valve head 38 and core 50 are thus connected depression of the valve head 38 as shown in Figs. 7 and 8 causes lowering of the core and thus puts tension on the jacket 51, causing it to dependably return or collapse onto the core and force liquid out of the structure.

In accordance with the preferred form of the invention a cell or cap 62 is joined to the reduced lower end portion 58 of the outlet valve jacket by a thin tubular connection 61. When the structure is filled and is in the position shown in Fig. 1 the cap or seal 62 closes the structure against contamination of fluid M either by air or foreign matter of any kind. When the structure is ready for use the light tubular connection 61 is cut out severing the cap 62 and thus opening the structure ready for operation.

From the foregoing description it will be apparent that the dispensing mechanism involves but two simple inexpensive elements, namely the elements shown in Figs. 5 and 6 of the drawings. In practice the base portion C, connecting portion F, the duct 36, the cell D, the jacket 51 of valve G and the cap 62 with its connection 61, are all formed of one continuous integral body of rubber or rubber-like material, which body is molded or formed to have the desired shape or configuration which may be as shown in Fig. 5 of the drawings. The other elements of the mechanism, as shown in Fig. 6, may involve a single casting or otherwise formed body of rigid material forming the valve head 38, guide 40, stem 60, and the core 50 of valve G.

In accordance with the present invention any suitable means may be employed for operating the mechanism above described, since operation of the mechanism merely involves collapsing of the cell D so that the walls 32 and 33 thereof are moved from a separated position such as is shown in Fig. 7 to a collapsed position such as is shown in Fig. 8.

In the form of the invention illustrated the operating means H is shown as including a fixed base plate 69, a pressure plate 70 which surrounds the duct 36 and overlies the cell D, and a pressure arm 71 which engages and operates the plate. The base plate 69 is a stationary or fixed element surrounding the jacket 51 and overlying the cell D. The plate 70 overlies the cell D and is subject to being moved downward or toward the plate 69 to effect operation of the mechanism. In the particular case illustrated the operating arm 71 is shown yoked to bear on spaced or opposite sides of the plate 70 and the arm is carried on a pivot pin 72 and is operated by a rod 73. When the mechanism is operated between the positions shown in Figs. 2 and 3 of the drawings plate 70 is moved down or toward the base 69 causing the cell D to be collapsed during the initial portion of which operation the inlet valve E is closed and during which time the outlet valve is open and the liquid from the chamber 35 of cell D is discharged through the outlet valve. If desired adjustable stops 80 may be provided to limit relative movement between the plates 69 and 70 and through adjustment of the stops 80 the mechanism may be adjusted to discharge the desired quantity of liquid upon each operation.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A dispensing mechanism handling liquid from a container supported in a fixed position including, a base applicable to the container, a unit with parts shiftable relative to the base and including, a collapsible cell, an inlet valve including a duct extending from the cell and a valve head operating to close the duct, and an outlet valve including, a core and an expansible jacket normally closed around the core and in communication with the cell, and an extensible connection joining the base and the duct of the inlet valve, the base, the connection, the duct, the cell and the jacket being integrally joined.

2. A dispensing mechanism handling liquid from a container supported in a fixed position including, a base applicable to the container, a liquid dispensing unit with parts shiftable relative to the base and including, a collapsible cell, an inlet valve including a duct extending from the cell and a valve head operating to close the duct, and an outlet valve including, a ported core and an expansible jacket normally closing the core and in communication with the cell, and an extensible liquid handling connection joining the base and the duct of the inlet valve, the base, the connection, the duct, the cell and the jacket being one continuous body of rubber.

3. A dispensing mechanism handling liquid from a container supported in a fixed position including, a base applicable to the container, a unit with parts shiftable relative to the base and including, a collapsible cell, an inlet valve including a duct extending from a part of the cell and a valve head operating to close the duct, an outlet valve including, a core and an expansible jacket normally closed on the core and in communication with the cell, an operator moving said part of the cell away from the base, and an extensible connection joining the base and the duct of the inlet valve, and a stem coupling the valve head and core.

4. A fluid dispenser of the character described including, a single continuous body of flexible material forming a cell with normally spaced opposed walls, one with an inlet opening and the other with an outlet opening, an inlet valve located between said walls and normally spaced from the first mentioned wall so the inlet is normally open, an outlet valve normally closing the outlet opening and opened by pressure of fluid in the cell, a support carrying said other wall, and an operator shiftable relative to the support and engaging the first mentioned wall at the exterior thereof and moving it toward said other wall and into engagement with the inlet valve to close the inlet opening and thereafter moving said first mentioned wall and the inlet valve toward said other wall to put pressure on fluid in the cell and force such fluid out of the cell past the outlet valve.

5. A fluid dispenser of the character described including, a single continuous body of flexible material forming a cell with normally spaced opposed walls, one with an inlet opening and the other with an outlet opening, the said body having an annular part joining the peripheral portions of the said spaced walls, an inlet valve located between said walls and normally spaced from the first mentioned wall so the inlet is normally open, an outlet valve normally closing the outlet opening and opened by pressure on fluid in the cell, a support carrying said other wall, and an operator shiftable relative to the support and engaging the first mentioned wall at the exterior thereof and moving it toward said other wall and into engagement with the inlet valve to close the inlet opening and thereafter moving said first mentioned wall and the inlet valve toward said other wall to put pressure on fluid in the cell and force such fluid out of the cell past the outlet valve, the said walls being operable relative to each other to a position where they are substantially together.

6. A fluid dispenser of the character described including, a single continuous body of flexible material forming a cell with normally spaced opposed walls, one with an inlet opening and the other with an outlet opening, an inlet valve located between said walls and normally spaced from the first mentioned wall so the inlet is normally open, an outlet valve normally closing the outlet opening and opened by pressure of fluid in the cell, a support carrying said other wall, and an operator shiftable relative to the support and engaging the first mentioned wall at the exterior thereof and moving it toward said other wall and into engagement with the inlet valve to close the inlet opening and thereafter moving said first mentioned wall and the inlet valve toward said other wall to put pressure on fluid in the cell and force such fluid out of the cell past the outlet valve, the said body having a tubular inlet duct projecting from the first mentioned wall and passing fluid to the cell and having a tubular outlet duct continuing from the outlet valve and discharging fluid passed by the outlet valve.

7. A fluid dispenser of the character described including, a single continuous body of flexible material forming a cell with normally spaced opposed walls, one with an inlet opening and the other with an outlet opening, an inlet valve located between said walls and normally spaced from the first mentioned wall so the inlet is normally open, an outlet valve normally closing the outlet opening and opened by pressure of fluid in the cell, a support carrying said other wall, and an operator shiftable relative to the support and engaging the first mentioned wall at the exterior thereof and moving it toward said other wall and into engagement with the inlet valve to close the inlet opening and thereafter moving said first mentioned wall and the inlet valve toward said other wall to put pressure on fluid in the cell and force such fluid out of the cell past the outlet valve, the outlet valve including a valve element joined to and moving with the inlet valve and a tubular part joined to and projecting from said other wall and normally embracing said valve element and anchored thereto to be extended longitudinally when the inlet valve is moved and extended laterally by fluid pressure from the cell.

8. A fluid dispenser of the character described including, a collapsible cell with normally spaced opposed walls, one with an inlet opening and the other with an outlet opening, an inlet valve located between said walls and normally spaced from the first mentioned wall so the inlet is normally open, an outlet valve normally closing the outlet opening and opened by pressure of fluid in the cell, a support carrying said other wall, and an operator shiftable relative to the support and engaging the first mentioned wall at the exterior thereof and moving it toward said other wall and into engagement with the inlet valve to close the inlet opening and thereafter moving said first mentioned wall and the inlet valve toward said other wall to put pressure on fluid in the cell and force such fluid out of the cell past the outlet valve, the outlet valve including a core rigid with the inlet valve and having an outlet port therein and a tubular jacket continuing from said other wall and communicating with the outlet opening and normally embracing the core and closing the port, said jacket being anchored to the core and being extended longitudinally when the inlet valve is moved and being expanded laterally by pressure from the cell to uncover the port in the core.

9. A fluid dispenser handling fluid from a container and including, a collapsible cell including normally spaced opposed walls, one of the opposed walls being movable toward the other of the opposed walls, and a flexible side wall joining the opposed walls, an inlet valve including, an inlet duct having one end fixed to the container and the other end joined to the movable wall and a valve head seating to close the duct and moving with the movable wall, an outlet valve including, a core having a fluid passage therethrough and a jacket of elastic material joined to said other of said opposed walls and to the core and normally embracing the core to close the passage, the jacket having a portion around the core and expansible to uncover the passage in the core, and a stem connecting the inlet valve head and the core of the outlet valve.

10. A fluid dispenser of the character described including, a collapsible cell having normally spaced flat substantially parallel walls and a free flexible curved side wall joining the said spaced walls, an inlet valve including an inlet duct joined to one of the spaced walls and a valve head in the cell and seating to close said duct, an outlet valve including a core having a fluid passage therethrough and an expansible jacket joined to the other of said spaced walls and normally embracing the core to close the passage therethrough, operating means for the cell including spaced relatively movable substantially flat members engaging the outer sides of said spaced walls of the cell, and a stem connecting the said valve head and said core, the cell, the duct and the jacket being one continuous body of rubber.

11. A dispenser handling fluid from a stationary container including, a collapsible cell having spaced opposed walls one with an inlet opening and the other with an outlet opening, valves controlling flow through said openings, a support holding said other wall stationary with the container, a shiftable operator moving the first mentioned wall relative to the container, and an extensible fluid handling connection having one end fixed to the container and the other end fixed to said first mentioned wall.

12. In combination two unitary elements, one being rigid and including a valve head, a valve core and a stem connecting the head and core, and the other being formed of rubber and including a collapsible cell, a duct communicating with the cell and controlled by the head, a base, an extensible connection from the base to the duct and a jacket communicating with the cell and cooperating with the core.

13. In combination, a unitary body of elastic material including, a container completely confining a supply of liquid, and a collapsible cell communicating with the container and having an outlet and normally carrying a charge of liquid to be dispensed through the outlet, and valve means normally closing the outlet and operable upon flexure of the cell to put pressure on the charge therein to pass fluid from the cell while closing communication between the cell and container, the valve means including a normally open inlet valve admitting liquid from the container to the cell and a normally closed outlet valve opened by pressure of liquid in the cell.

14. In combination, a structure of elastic material including, a collapsible container completely occupied by a supply of liquid, and a collapsible cell communicating with the container and having a tubular outlet and normally carrying a charge of liquid to be dispensed through the outlet, valve means normally closing the outlet and operable upon flexure of the cell to put pressure on the charge therein to pass fluid from the cell while closing communication between the cell and container, and an operator engageable with the exterior of the cell to flex the cell and exert pressure on the charge therein, the valve means including a ported valve member engaged in the tubular outlet and normally embraced thereby so the port in the valve member is normally closed, the tubular outlet being expansible by pressure on the charge in the cell to uncover the said port, a valve head in the cell closing communication between the container and cell when the cell is flexed by the operator.

15. A fluid dispenser including, a collapsible cell having relatively movable walls one with an inlet opening and the other with an outlet opening, a normally open inlet valve controlling flow into the cell through the opening in the first mentioned wall, an outlet valve controlling flow out of the cell through the opening in said other wall, and operating means shifting one wall relative to the other, the outlet valve including an expansible tubular jacket projecting from said other wall and communicating with the outlet opening and a core in the jacket normally embraced by the jacket, the jacket having a closed severable end projecting beyond the core.

LEO M. HARVEY.

REFERENCES CITED

The following references are of record in the file of this patent:

UNITED STATES PATENTS

| Number | Name | Date |
|---|---|---|
| 996,330 | Haines | June 27, 1911 |
| 1,392,600 | Rose | Oct. 4, 1921 |
| 1,392,601 | Rose | Oct. 4, 1921 |
| 1,570,861 | Quiroz | Jan. 26, 1926 |
| 2,314,745 | Wesley | Mar. 23, 1943 |
| 2,444,003 | Chesler | June 22, 1948 |